April 21, 1964  K. M. NOWAK  3,130,334
RECIPROCATING MOTOR
Filed Nov. 4, 1960  4 Sheets-Sheet 1
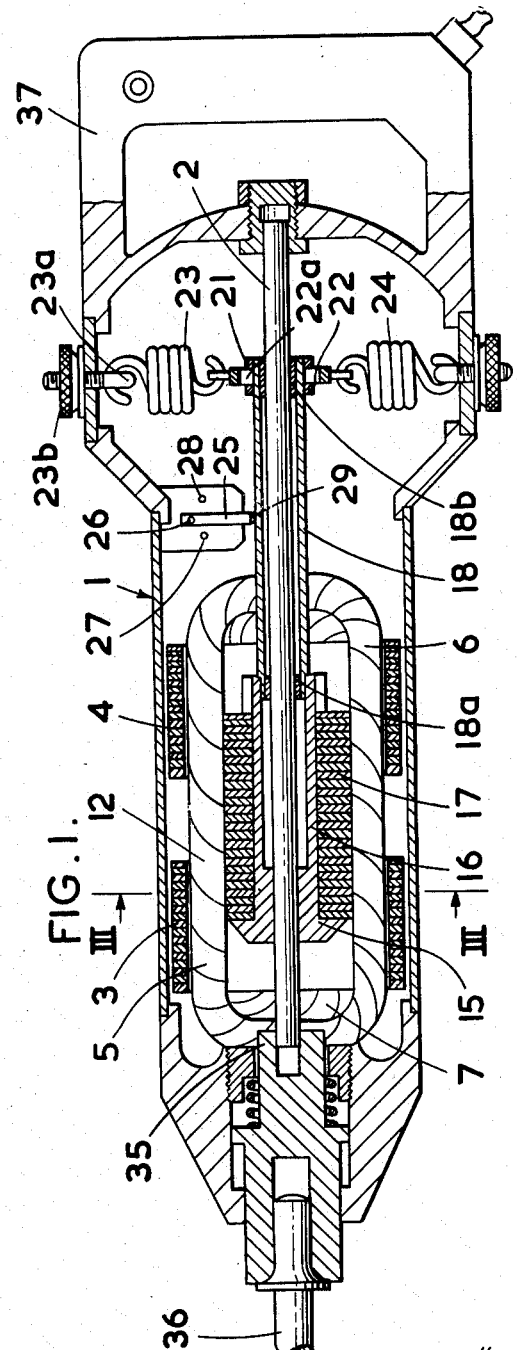
FIG. I.
INVENTOR
Kasimierz Marian Nowak
By
Watson, Cole, Grindle & Watson
ATTORNEYS

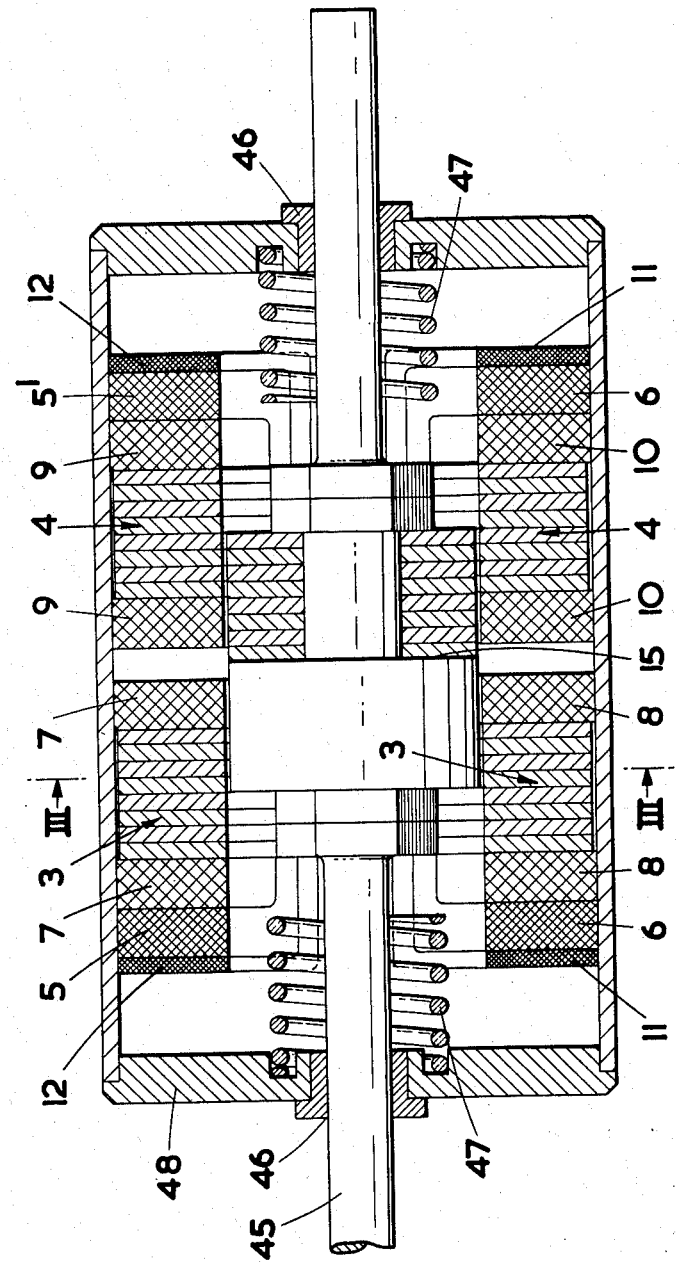

April 21, 1964  K. M. NOWAK  3,130,334
RECIPROCATING MOTOR
Filed Nov. 4, 1960  4 Sheets-Sheet 3
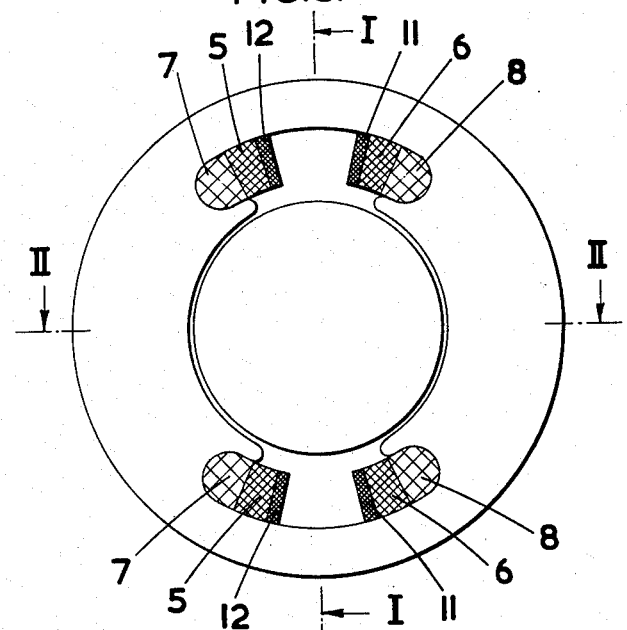
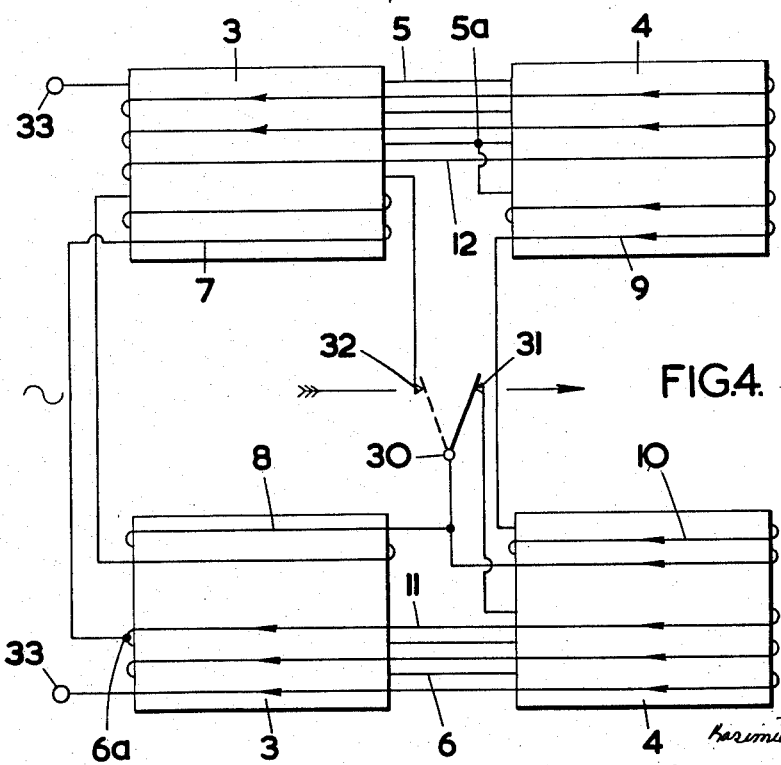
INVENTOR
Kazimierz Marcin Nowak
BY
Watson, Cole, Grindle & Watson
ATTORNEYS April 21, 1964  K. M. NOWAK  3,130,334
RECIPROCATING MOTOR
Filed Nov. 4, 1960  4 Sheets—Sheet 4
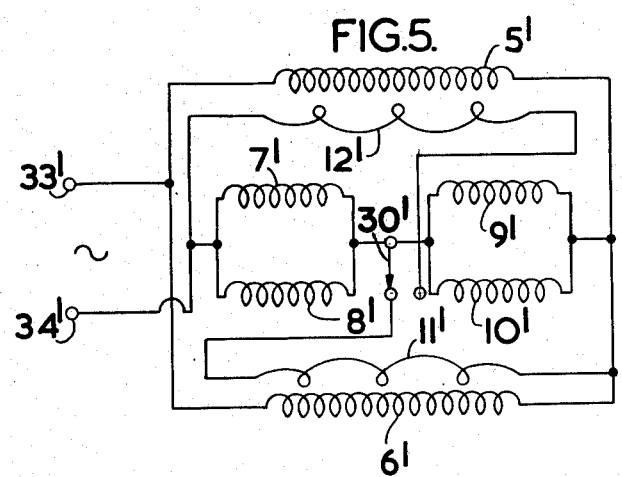
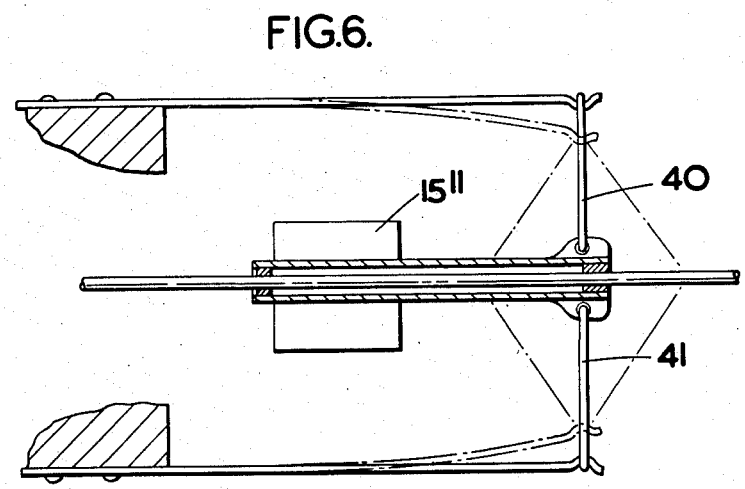
INVENTOR
Kasimierz Marian Nowak
By
Watson, Cole, Grindle & Watson
ATTORNEYS

United States Patent Office 3,130,334
Patented Apr. 21, 1964

3,130,334
RECIPROCATING MOTOR
Kazimierz Marian Nowak, 294 Edgware Road,
London W.2, England
Filed Nov. 4, 1960, Ser. No. 67,366
8 Claims. (Cl. 310—35)

This invention relates to electric motors.

The main object of the invention is to provide a simple and reliable reciprocating A.C. motor.

The invention provides a reciprocating alternating current electric motor comprising at least a pair of annular laminated soft iron stator members (called first and second stator members) each providing at least a pair of opposed aligned poles, and a soft iron core mounted for reciprocation between a first position opposite the first stator member and a second position opposite the second stator member the arrangement being such that in both first and second positions the core remains within the influence of the second and first stator members respectively. Windings are provided on each stator member and switching means are arranged for operation synchronously with movement of the core, the windings and switching means being connected so that, whichever may be the direction of movement of the core at a particular instant of time, there are two current paths; the purpose of the first path is to produce A.C. excitation for both stator members but more ampere-turns on the stator member to which the core is moving at the particular instant, while the second path is a closed internal circuit including a large number of turns on the other stator member and a much smaller number of turns on said stator member to which the core is moving, and the two paths include a common portion containing the switch. The A.C. excitation in the first path accordingly induces a current in the second path and the two currents are opposed over the common portion when the core member is adjacent the stator member towards which it is moving whereby to produce substantially zero-current conditions for the changeover of the switching means.

Two embodiments of the invention and various modifications will now be described by way of example with reference to the accompanying drawings in which:

FIGURE 1 is a longitudinal axial section of a percussion tool incorporating a motor according to the invention;

FIGURE 2 is an axial section of a motor according to the invention suitable for operating a reciprocating pump;

FIGURE 3 is a diagrammatic transverse section of the apparatus shown in either FIGURE 1 or FIGURE 2, the planes of the sections of those figures being indicated respectively by the lines I—I and II—II;

FIGURE 4 is a wiring diagram illustrating the way in which the windings shown in FIGURES 1 and 2 are connected;

FIGURE 5 is a wiring diagram showing an alternative wiring arrangement, and

FIGURE 6 shows an alternative biassing arrangement to those illustrated in FIGURES 1 and 2.

Referring to FIGURES 1, 3 and 4 of the drawings, the tool comprises a body 1 mounting a stationary axial guide rod 2 and a pair of coaxial similar laminated soft iron stator members 3, 4, each providing an opposed pair of salient poles facing radially inwards; more poles can be provided if desired but a bi-polar construction is simpler to wind and will normally be preferred. The adjacent poles of the two stator members carry common windings 5, 6, and each pole carries an individual winding 7, 8, 9, 10. The poles of the stator members 3, 4, carry similar supplementary windings 11, 12 having only a small fraction of the number of turns on each individual winding: these windings 11, 12 are in fact a continuation of the windings 5, 6, each of the points 5a, 6a being a tapping on one composite winding.

A core member designated generally 15 and consisting of a non-magnetic body 16 mounting a multiplicity of soft iron laminations 17 is slidably mounted on the guide rod 2 between first and second end positions respectively within the stator member 3 and the stator member 4. The axial length of the laminations 17 is about equal to the axial length of one stator member plus the length of the gap between the stator members. A tube 18 surrounds the guide rod 2 and has bushings 18a, 18b secured at either end whereby it is freely slidable on the rod. One end of the tube 18 is fixed to one end of the core member 15 and helps to mount it on the rod 2. The other end of the tube 18 carries a pair of rings 21, 22 which locate axially a yoke 22a capable of sliding perpendicularly to the tube 18. A pair of opposed equal tension springs 23, 24 are hooked at one end to opposite sides of the yoke, their other ends being hooked to eyes 23a, 24a supported from the body 1 of the tool. The arrangement is such that the springs urge the core member 15 to take up a position midway between the two stator members 3, 4 as illustrated. The springs can be adjusted by means of an adjusting screw 23b acting on the eye 23a. A switch actuating element 25 is pivotally supported to the body 1 at 26: the angular movement of the element is limited to a few degrees only by stops 27, 28 so that the element is roughly perpendicular to the tube 18. The element 25 has a nose 29 urged by means not shown into frictional contact with the tube 18: thus as the tube moves towards the right, say, the element lies against the right-hand stop, and vice versa.

The actuating element 25 controls a switch (indicated diagrammatically in FIGURE 4 only) capable of connecting a terminal 30 with either one or other of terminals 31, 32: the arrangement is such that as the core member 15 moves towards its second position (rightwards in FIGURES 1 and 4) terminals 30 and 31 are connected and as the member 15 moves in the opposite direction, terminals 30 and 32 are connected. The common windings 5, 6 each have one end connected to one terminal of an A.C. supply indicated at 33 and the other (the tapping points 5a, 6a respectively) connected in series through the individual windings 7, 8 (or 9, 10) of one (or other) stator member to the terminal 30. The supplementary windings 11, 12 are connected between said other ends of the common windings, the points 5a, 6a, and the terminals 31, 32 respectively.

It will be seen from FIGURE 4 that—neglecting the effect of the supplementary windings 11, 12 and of the iron of the core member 15, as explained below—the exciting current through the common and individual windings 5, 6 and 7, 8, 9, 10, flows so that the ampere-turns of all these windings are effective in the same sense. These windings apply a permanent load on the supply during operation of the tool. It will also be seen that when terminals 30 and 31 are connected an internal circuit is formed through the individual windings 7, 8 and supplementary winding 11; similarly when terminals 30 and 32 are connected, an internal circuit is formed through windings 9, 10 and 12.

The tool comprises further an anvil member 35 axially disposed on the body 1 and connected to a pick 36 and a handle 37 at the end of the body opposite the pick.

The operation of the tool is as follows: if the core member 15 starts to move from its first to its second end position (i.e. from left to right in FIGURES 1 and 4) terminals 30 and 31 are connected and supplementary winding 11 is energized. Both common windings 5, 6 are energized and also the individual windings 9, 10, and a circuit is completed through the supplementary winding 11 and the individual windings 7, 8 which are substantially unenergized by the supply 33 since they are in effect shorted out by the supplementary winding 11 due to its having fewer turns. Due to the presence in the stator member 3 of the core member 15 and the completion of the internal circuit through windings 7, 8 and 11, the common windings 5, 6 and the individual windings 7, 8 act respectively as primary and secondary of a transformer. The numbers of turns on the various windings (see example below) are arranged so that the flux in the stator member 3 is comparatively weak and its direction at any instant is opposite to that which the common windings 5, 6 alone would produce. The common windings 5, 6 and individual windings 9, 10 combine to produce a strong solenoid effect in stator member 4, the flux therein at any instant being strong and its direction opposite to that of the stator member 3. Even at the beginning of its movement to the right the core member 15 is within the influence of the stator member 4 as well as that of the member 3. As a result the core member 15 is moved to the right. As it moves away from the stator member 3 the reluctance of the iron path thereof increases and that of the member 4 decreases: the combined transformer action in stator members 3 and 4 wherein the internal circuit of windings 7, 8 and 11 forms the secondary produces a current opposing the exciting current from the mains such that the total current across the switch contacts is about zero when the core member 15 reaches the right hand end of its travel; the springs 23, 24 will then begin to move it in the reverse direction. The switch actuating element 25 will then cause terminals 30 and 31 to be disconnected and terminals 30 and 32 connected. The action is now opposite to that above described. When the member 15 reaches its first position it will again reverse and further cycles of operation will follow.

In the left hand end position of the bore member 15 the left hand end of the laminations 17 thereof extend just beyond the left hand end of member 3: in the right hand end position the right hand end of the laminations extend just beyond the right hand end of member 4. Some shortening of the stroke is possible.

The above explanation of the operation of the motor is offered in the expectation that it will help the reader to understand the invention. It is to be appreciated, however, that the invention in no way depends on the accuracy of the explanation just given and that is explanation at best merely summarizes the main factors involved: the interaction of the various features illustrated is clearly very complex.

It will be appreciated that the end positions of the core member 15 are defined by various factors, including the location of the stator members 3, 4, the inertia of the member 15 and the strength of the springs 23, 24. It will also be appreciated that for successful operation over long periods the switch must operate at more or less zero current: thus the core member end positions, and the travel of the switch actuating element 25, must be arranged to obtain switching at zero cutting. It has been found that unless the number of turns on the various windings, and more particularly the ratio of individual winding turns to supplementary winding turns, are correctly chosen, it is in practice very difficult to arrange all the factors so that switching occurs when the current is near enough to zero: that is to say, the current/displacement curve crosses the displacement axis too nearly at a right angle. It has been found that satisfactory results are obtainable with windings arranged as in FIGURE 4 and having turns in the following proportions—each common winding 250, each individual winding 250 and each supplementary winding 50: i.e. with these proportions the current-displacement curve shows a sufficient dwell on crossing the displacement axis. The figures given represent actual numbers of turns of 23 S.W.G. enamelled copper wire in the core of one successful motor operating on 240 v. 50 cycle single phase A.C. and consuming 300 watts.

In a further example of successful motor according to the invention the windings, again arranged as in FIGURE 4, were as follows: each common winding, 280 turns; each individual winding 280 turns; and each supplementary winding 56 turns. All windings were wound in wire enamelled copper of 28 S.W.G. Yet another practical form of motor wound as in FIGURE 4 had turns as follows: each common winding 165 turns, each individual winding 165 turns; and each supplementary winding 33 turns. The wire in this case was, for all windings, 18 S.W.G. enamelled copper.

In the example illustrated in FIGURES 1 and 2 the body 16 of the core member 15 forms a hammer delivering a blow to the anvil member 35, and thence to the pick 36 once per cycle of operations. The invention can however also be applied inter alia to stamping machines, reciprocating pumps and compressors of all sorts, a great variety of tools such as saws, hammers, chisels and drills, as well as polishers, and concrete vibrators.

A motor according to the invention suitable for actuating a reciprocating pump is shown in FIGURE 2, the cross section and wiring diagram of this motor being the same as those of the FIGURE 1 motor and illustrated respectively in FIGURES 3 and 4. Parts of the FIGURE 2 motor generally similar to those of the FIGURE 1 motor are given the same reference numerals and will need no further description. The main differences between the two motors lies in (a) the rigid fixing of the core member 15 to a shaft 45 mounted for axial sliding in bushes 46 supported in end plates 48 secured to the casing 1, and (b) the provision of buffer springs 47 threaded on the shaft 45 and abutting the bushings 46, these springs 47 initiating the reversal of the core member 15 at either end of its stroke in place of the springs 23, 24 of FIGURE 1;

unlike the core member 15 of FIGURE 1, that of FIGURE 2 is free of spring bias except adjacent the end of its stroke. A switch and actuating means therefor (not shown) such as provided by the assembly 25, 26, 27, 28 in FIGURE 1 is secured to the outside of one end plate 46, the actuating element acting directly on the shaft 45.

The frequency of operation of a motor according to the invention is within wide limits independent of the A.C. supply frequency and can be controlled by varying the mass and travel of the core member, the tension of the springs and the supply voltage: frequencies varying from 60 to 3,000 per minute are easily obtainable. Normally the general design of the motor will determine the broad range of frequencies while adjustment within that range will be made by adjustments of spring tension and regulation of the voltage of the supply. The motor can be constructed so that inertia of the core member, the giving and taking of energy by the springs and the forces applied by the windings combine to produce a resultant output force which has any desired relation with the position of the core member in its stroke. Thus the force can be greatest at the beginning, at the middle, or at the end of the stroke or may be more or less constant, depending on the work which has to be done by the particular device. It will be generally found advantageous to operate the motor at resonance.

FIGURE 5 shows an alternative circuit for the motor of FIGURES 1 or 2: it will be appreciated that the circuit operates in the same way as that of FIGURE 4 and differs only in the parallel connection of individual and common windings: the same reference numerals are used as in FIGURE 4, but are distinguished by a prime.

It will be understood that the wiring diagram of FIGURE 4 is susceptible of much more radical alteration than is shown in FIGURE 5. Thus, although not normally desirable, a single common winding or a single individual winding on each stator member will suffice in place of the pairs illustrated, and the common winding or each common winding can be made in two series-connected parts one on each stator member, the arrangement shown being preferred for economy of space and ease of winding. Similarly, supplementary windings wound over both stator members together are preferred, but the winding 11 shown in FIGURE 4 could be replaced by a winding on member 4 only, and the winding 12 by one on member 3 only. When the core member 15 is travelling to the right in FIGURE 4 the individual windings 9, 10 should be energized by mains current, and on reversal of the core member the windings 7, 8 should be so energized; it is however not necessary for the supplementary windings 11, 12 to be traversed by mains current on rightward and leftward movement respectively, though this is preferred: the internal circuit at each movement would then entirely separate from that carrying mains current, though this would entail a multi-pole switch that the arrangements of FIGURES 4 and 5 have been designed (inter alia) to avoid. Various combinations of these modifications of the FIGURE 4 arrangement can be made.

Among other modifications the motor specifically described can have more than two stator members and a corresponding winding and switching arrangement so that successive pairs of stator members act as above described as the core member travels between end positions. This arrangement will be particularly useful where a long stroke is required. The springs 23, 24 will be dispensed with in many applications, such as when the motor drives an air compressor, and replaced simply by end buffer springs. The compression of the air in the compressor can provide one of these springs. A further arrangement of springs is shown in FIGURE 6, where the core member 15' is connected by links 40, 41 to cantilevered leaf springs: the end positions of the member are shown chain-dotted.

In certain cases the mechanical switch such as above described can be replaced by electrical switching means operated by the presence of the iron on the core member at a certain point, or points, in its stroke. A switch such as illustrated can be made to work on the core member itself, and arranged centrally of the stator members.

Ventilation can be effected by using the pumping effect of the core member and providing suitable vents in the casing.

I claim:
1. A reciprocating electric motor for alternating current operation comprising at least a first and second laminated soft iron stator member providing a pair of opposed aligned poles, a laminated soft iron core mounted for reciprocation between a first position opposite the first stator member and a second position opposite the second stator member, winding means on each stator member for creating a magnetic field, said stator members having such spacing and length relative to the core that the core remains under the influence of the magnetic field surrounding both the stator members, switching means operated synchronously with movement of the core to change contact positions at each extremity of movement of the core, a circuit including the windings and the switching means connected to provide a first current path for exciting both stator members with a greater number of ampere-turns on the stator member toward which the core is moving and a second current path comprising a closed internal circuit including a larger number of turns on the remaining stator member compared with the turns on the stator member toward which the core is moving wherein the paths include a common portion comprising said switching means, and windings in the winding means being so disposed to induce current in the second path from current flow in the first path such that the two currents are opposed in said common portion at the extremity of the core member movement to produce substantially zero current flow as the switching contacts change.

2. A motor as defined in claim 1, wherein the windings comprise common windings on the stator members providing equal ampere turns to each stator member, further individual equal windings on each of the stator members, additional supplementary windings on each of the stator members having relatively few turns compared with said further separate equal windings, an A.C. current source, and the switching means connecting with movement of the core the further separate winding of one stator member and the common windings to the current source while completing an internal circuit through the supplementary winding on said one stator winding and the further separate winding of the other stator member, and the switching means is a bistable position switch changing position substantially at the instant of change of direction, thereby changing the internal circuit connection to the windings of the other stator members.

3. An electric motor as defined in claim 2, wherein for each switch position the supplementary winding on the stator member toward which movement of the core is progressing is connected for current to traverse it in a direction contrary to current induced in the winding in the internal circuit.

4. An electric motor as defined in claim 2 including for the pair of stator members a further pair of supplementary windings each providing equal ampere turns to each stator member, and wherein the switch connects a respective one of the further supplementary windings in series with the common windings and opens the other in each position.

5. An electric motor as claimed in claim 2, wherein there are only two stator members and each turn of each supplementary winding links both stator members.

6. An electric motor as claimed in claim 2, wherein the individual windings of both stator members are connected permanently in series with the common windings.

7. An electric motor as claimed in claim 2, wherein the switching means includes a single-pole double throw switch.

8. An electric motor as claimed in claim 2 wherein the switching means includes a single-pole double throw switch having a movable contact pivoted for small angular movement limited by a pair of fixed contacts, and a nose mounted on the movable contact to pivot therewith and urged into frictional contact with a part rigid with the core whereby friction between said nose and said part pivots the movable contact against that fixed contact which lies in the direction of movement of the core.

References Cited in the file of this patent

UNITED STATES PATENTS

| | | |
|---|---|---|
| 357,374 | Darling | Feb. 8, 1887 |
| 424,535 | Bock | Apr. 1, 1890 |
| 824,953 | Schieman | July 3, 1906 |
| 1,014,495 | Lincoln | Jan. 9, 1912 |
| 1,140,447 | Dekhotinsky | May 25, 1915 |
| 1,651,306 | Weyandt | Nov. 29, 1927 |
| 1,678,278 | Weyandt | July 24, 1928 |
| 1,969,981 | Jonca | Aug. 14, 1934 |
| 2,169,539 | Shebol | Aug. 15, 1939 |
| 2,690,128 | Basilewsky | Sept. 28, 1954 |
| 2,691,739 | McHenry | Oct. 12, 1954 |
| 2,827,604 | Cloud | Mar. 18, 1958 |